US009936333B2

(12) United States Patent
Lau et al.

(10) Patent No.: US 9,936,333 B2
(45) Date of Patent: Apr. 3, 2018

(54) LOCATION AND CONTEXTUAL-BASED MOBILE APPLICATION PROMOTION AND DELIVERY

(75) Inventors: James Kai Yu Lau, Bellevue, WA (US); John P. Bruno, Jr., Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 382 days.

(21) Appl. No.: 12/854,157

(22) Filed: Aug. 10, 2010

(65) Prior Publication Data

US 2012/0042036 A1    Feb. 16, 2012

(51) Int. Cl.

| G06F 15/16 | (2006.01) |
|---|---|
| G06Q 50/00 | (2012.01) |
| H04W 4/00 | (2018.01) |
| G06F 9/445 | (2018.01) |
| H04W 4/02 | (2018.01) |
| H04W 8/00 | (2009.01) |
| H04W 64/00 | (2009.01) |
| H04W 68/00 | (2009.01) |

(52) U.S. Cl.
CPC .............. *H04W 4/003* (2013.01); *G06F 8/61* (2013.01); *H04W 4/02* (2013.01); *H04W 8/005* (2013.01); *H04W 64/00* (2013.01); *H04W 68/00* (2013.01)

(58) Field of Classification Search
USPC ............... 455/456.1; 709/219, 224; 705/26.7
See application file for complete search history.

(56) References Cited

U.S. PATENT DOCUMENTS

| 6,629,136 B1 * | 9/2003 | Naidoo ............... G06F 17/3087 |
|---|---|---|
| | | 707/999.104 |
| 6,957,393 B2 | 10/2005 | Fano et al. |
| 7,283,846 B2 | 10/2007 | Spriestersbach et al. |

(Continued)

FOREIGN PATENT DOCUMENTS

| CN | 1500350 A | 5/2004 |
|---|---|---|
| CN | 101448247 A | 6/2009 |

(Continued)

OTHER PUBLICATIONS

Aziz et al., "Context Aware Information Delivery for On-Site Construction Operations," *Centre for Innovative & Collaborative Engineering*, 2005, 7 pages.

(Continued)

*Primary Examiner* — Aftab N. Khan
(74) *Attorney, Agent, or Firm* — Klarquist Sparkman, LLP

(57) ABSTRACT

Apparatus and methods are disclosed for selecting one or more mobile device applications using context data describing the current environment of a mobile device and application metadata describing environment conditions where applications are more likely to be relevant, in order to improve the experience of discovering, downloading, and installing mobile device applications. According to one embodiment, a method comprises associating metadata with mobile device applications automatically receiving context data representing a current geographical location from a mobile phone, searching the metadata to determine which applications are likely of interest based on the current geographical location, and transmitting notification data to the mobile phone indicating the determined applications.

33 Claims, 13 Drawing Sheets

(56) References Cited

U.S. PATENT DOCUMENTS

| | | | |
|---|---|---|---|
| 7,472,376 B2 | 12/2008 | Burcham et al. | |
| 7,487,499 B2* | 2/2009 | Gatz | 717/168 |
| 7,617,042 B2 | 11/2009 | Horvitz et al. | |
| 7,703,611 B1* | 4/2010 | Appelman | G06Q 10/107 209/206 |
| 7,720,606 B2* | 5/2010 | Burfeind | G06Q 30/02 340/539.28 |
| 7,765,245 B2* | 7/2010 | Nichols et al. | 707/825 |
| 8,060,606 B2* | 11/2011 | Friedman et al. | 709/224 |
| 2002/0050927 A1 | 5/2002 | De Moerloose et al. | |
| 2004/0171379 A1 | 9/2004 | Cabrera et al. | |
| 2005/0159188 A1* | 7/2005 | Mass | G06F 3/0481 455/566 |
| 2006/0031830 A1* | 2/2006 | Chu | G06F 21/10 717/174 |
| 2007/0006098 A1 | 1/2007 | Krumm et al. | |
| 2007/0173236 A1* | 7/2007 | Vishwanathan et al. | 455/414.1 |
| 2007/0214245 A1 | 9/2007 | Hamalainen et al. | |
| 2007/0263069 A1 | 11/2007 | Jendbro | |
| 2008/0032739 A1* | 2/2008 | Hoodbhoy et al. | 455/556.2 |
| 2008/0263024 A1* | 10/2008 | Landschaft | G06F 17/3087 |
| 2009/0061890 A1* | 3/2009 | Andreasson | H04M 1/72525 455/456.1 |
| 2009/0138477 A1* | 5/2009 | Piira et al. | 707/10 |
| 2009/0164772 A1* | 6/2009 | Karkaria et al. | 713/100 |
| 2009/0235283 A1 | 9/2009 | Kim et al. | |
| 2009/0248729 A1 | 10/2009 | Bruno et al. | |
| 2009/0254670 A1 | 10/2009 | Kim et al. | |
| 2009/0254824 A1 | 10/2009 | Singh | |
| 2009/0254926 A1 | 10/2009 | Kim et al. | |
| 2009/0307105 A1* | 12/2009 | Lemay | G06F 8/61 705/26.1 |
| 2009/0327314 A1 | 12/2009 | Kim et al. | |
| 2009/0328177 A1 | 12/2009 | Frey et al. | |
| 2010/0057562 A1 | 3/2010 | Gabbay | |
| 2010/0105370 A1* | 4/2010 | Kruzeniski | G06F 3/0482 455/414.3 |
| 2010/0169153 A1 | 7/2010 | Hwacinski et al. | |
| 2010/0222102 A1* | 9/2010 | Rodriguez | G06Q 30/02 455/557 |
| 2010/0241417 A1 | 9/2010 | Bassett et al. | |
| 2010/0241579 A1 | 9/2010 | Bassett et al. | |
| 2010/0241755 A1 | 9/2010 | Bassett et al. | |
| 2010/0260426 A1 | 10/2010 | Huang et al. | |
| 2010/0262619 A1* | 10/2010 | Zargahi | G06F 8/61 707/770 |
| 2010/0262958 A1 | 10/2010 | Clinton et al. | |
| 2010/0262959 A1 | 10/2010 | Bruno et al. | |
| 2011/0009075 A1* | 1/2011 | Jantunen et al. | 455/73 |
| 2011/0137881 A1* | 6/2011 | Cheng | G06F 17/3087 707/706 |
| 2011/0264655 A1* | 10/2011 | Xiao | G06F 17/30616 707/728 |
| 2011/0279453 A1* | 11/2011 | Murphy | G06T 13/00 345/420 |
| 2011/0296401 A1* | 12/2011 | DePoy | G06F 8/60 717/174 |
| 2011/0320307 A1* | 12/2011 | Mehta | G06Q 30/0282 705/26.7 |
| 2012/0141096 A1* | 6/2012 | Ellis et al. | 386/297 |
| 2012/0290583 A1* | 11/2012 | Mahaniok | G06F 8/60 707/741 |
| 2013/0114849 A1* | 5/2013 | Pengelly et al. | 382/103 |
| 2013/0132566 A1* | 5/2013 | Olsen | H04W 4/025 709/224 |

FOREIGN PATENT DOCUMENTS

| | | |
|---|---|---|
| CN | 101796803 A | 8/2010 |
| JP | 2005-148939 | 6/2005 |
| WO | WO-2007/126996 A2 | 11/2007 |

OTHER PUBLICATIONS

Georss.org, "GeoRSS GML," downloaded from http://georss.org/gml, 7 pages (document marked Jun. 1, 2009).

Georss.org, "GeoRSS-Simple," downloaded from http://georss.org/simple, 3 pages (document marked Jun. 10, 2010).

MacVittie, "Geolocation and Application Delivery," F5 Networks, Inc. White Paper, 2010, 8 pages.

Safe Software Inc., "GeoRSS/RSS Feed Reader/Writer," downloaded from http://www.safe.com/reader_writerPDF/georss.pdf, 16 pages (document not dated, downloaded on Nov. 11, 2010).

International Search Report and Written Opinion dated Apr. 6, 2012, for PCT/US2011/044585, 11 pages.

China Patent Application No. 201110260486.9, Final Office Action, Apr. 14, 2014, 10 Pages.

Notice on the First Office Action from China Application No. 201110260486.9, dated Jul. 3, 2013, 13 pages.

Notice on the First Office Action from China Application No. 201110260486.9, dated Nov. 19, 2013, 13 pages.

Taiwan Patent Application No. 100125326, Notice of Office Action, dated May 26, 2016, 11 Pages.

* cited by examiner

LOCATION AND CONTEXTUAL-BASED MOBILE APPLICATION PROMOTION AND DELIVERY

FIELD

The present disclosure pertains to apparatus and methods for discovering new mobile device applications based on the current context of a mobile device.

BACKGROUND

With the increasing popularity of mobile computing platforms having access to hundreds or thousands of applications, including cellphone devices, handheld devices, handheld computers, smartphones, and PDAs, there is a need for improving the user experience by allowing easy discovery of the most relevant applications without the need to browse through thousands of less relevant applications, or be in practice limited to only the most popular applications.

Finding device applications can be burdensome, based on the potentially large number of applications that a user must browse through or search for before finding an application the user wishes to download. Furthermore, finding applications relevant to a user's current environment, especially for locations that are less frequently visited, can be difficult. Because of these difficulties, many applications that are otherwise desirable to a mobile device user are never discovered, thereby limiting the availability and adoption of highly relevant, but undiscovered mobile computing applications.

Therefore, there exists ample opportunity for improvement in technologies to facilitate discovery of applications for mobile devices using context information based on the current environment of a mobile device.

SUMMARY

Apparatus, computer-readable storage media, and methods are disclosed for allowing mobile device users to discover applications for a mobile device using context information describing the current environment of a mobile device, including location, time, and user data (e.g., user calendar information).

The current model of discovering applications for mobile devices is not scalable. For example, Apple Computer's App Store includes over 150,000 apps, and it is becoming increasingly difficult for mobile device users to discover applications that are relevant. In practice, instead of sifting or searching thousands of applications, most mobile device users resort to looking at the "What's New" or a list of Top 25 applications when they go to the App Store, thereby missing out on discovering the wide selection of applications available for various mobile devices.

Moreover, there are many mobile device applications that are considered very relevant based on a user's current environment, but that are very difficult to discover under a traditional application store model. For example, Seattle's Woodland Park Zoo offers an application that allow users to track their location on zoo grounds, access additional information on animals, and view daily schedules of zoo activities. However, such an application can be difficult for users to discover, because the application is not as popular as other applications that appeal to a larger audience. Thus, a context-based application cataloging and discovery service allows global application distribution and monetization models to scale to more granular, more targeted, and presumably more relevant audiences. As described further below, location-based and other environment-based promotion of applications not only solves the discovery problem in large, diverse application catalogs, but gives developers and businesses the ability to more precisely reach target audiences with their application content.

One exemplary embodiment disclosed herein is a method comprising transmitting context data based at least in part on a current environment of the mobile device, and automatically receiving application data for a first application executable on the mobile device, where the first application is selected based on the transmitted context data and on application metadata associated with the first application, and where the application metadata represents the relevance of one or more applications to environment-based conditions of the mobile device.

In some examples, the application data comprises computer-readable instructions for the first application that are executable on the mobile device. In some examples, the first application is a network application and the application data comprises an address associated with the first application. In some examples, the first application is installed on the mobile device prior to the acts of transmitting the context data and receiving the application data. In some examples, the method further comprises generating output with the mobile device operable to notify a mobile device user of the availability of computer-readable instructions for the first application. In some examples, the application data comprises an address for remotely retrieving computer-readable instructions that are executable on the mobile device.

In some examples, the method further comprises transmitting second context data representing the second current mobile device environment after moving the mobile device to a second environment, automatically receiving computer-readable instructions for a second, different, application that are executable on the mobile device, where the second application is selected based on the transmitted second context data.

Another exemplary embodiment disclosed herein is a method comprising receiving context data from a remote device, the context data being based at least in part on a current location of the remote device, receiving application metadata associated with one or more applications executable by the remote device, the application metadata comprising data representing the relevance of the applications to one or more locations, selecting one or more of the applications based at least in part on the context data and the application metadata, and transmitting data for the selected applications to the remote device.

In some examples, the method further comprises transmitting computer-readable instructions for the selected applications to the remote device, wherein the computer-readable instructions, when executed, cause the remote device to perform a method associated with the selected applications. In some examples, the application metadata comprises data based on previous usage of at least one of the applications on a mobile device while the mobile device was in or near the current location. In some examples, the data for the selected applications includes one or more network addresses associated with the selected applications. In some examples, the data for the one or more selected applications includes audio data, video data, or audio data and video data.

A further exemplary embodiment disclosed herein is a method of delivering an application to a mobile device, comprising associating metadata with one or more applications downloadable and executable on a mobile phone, automatically receiving context data from the mobile phone comprising data representing a current geographical location, searching the metadata based on the context data to determine which applications could be of interest based on the current geographical location, and transmitting notification data to the mobile phone indicating the determined applications.

In some examples, the method further comprises selecting one of the applications, transmitting the selected application to the mobile phone, and executing the selected application on the mobile phone. In some examples, the application is an executable program. In some examples, the metadata includes criteria, which if satisfied, result in determining the application of interest. In some examples, the method further comprises automatically installing the determined applications, and automatically removing one or more of the determined applications if they are not accepted by a user of the mobile phone.

In other exemplary embodiments, computer-readable storage media or mobile device apparatus store computer-readable instructions that when executed by a computer, cause the computer to perform some or all of the methods described herein.

The described techniques and tools for solutions for improving the mobile device experience and performance can be implemented separately, or in various combinations with each other. As will be described more fully below, the described techniques and tools can be implemented on hardware that includes access to: geospatial data for the device, data about other devices or objects that are in close proximity (e.g., data acquired using short-range wireless technologies), data such as weather or time, images captured using an image capture device (e.g., a camera), or user-specific data such as calendar appointment data or vacation data. As will be readily apparent to one of ordinary skill in the art, the disclosed technology can be implemented using various mobile computing platforms coupled with a network server or computing cloud providing access to applications for various mobile device platforms, including, but not limited to, cellphones, smartphones, PDAs, handheld devices, handheld computers, PDAs, touch screen tablet devices, tablet computers, and laptop computers.

The foregoing and other objects, features, and advantages of the invention will become more apparent from the following detailed description, which proceeds with reference to the accompanying figures.

DETAILED DESCRIPTION

Figure 1:
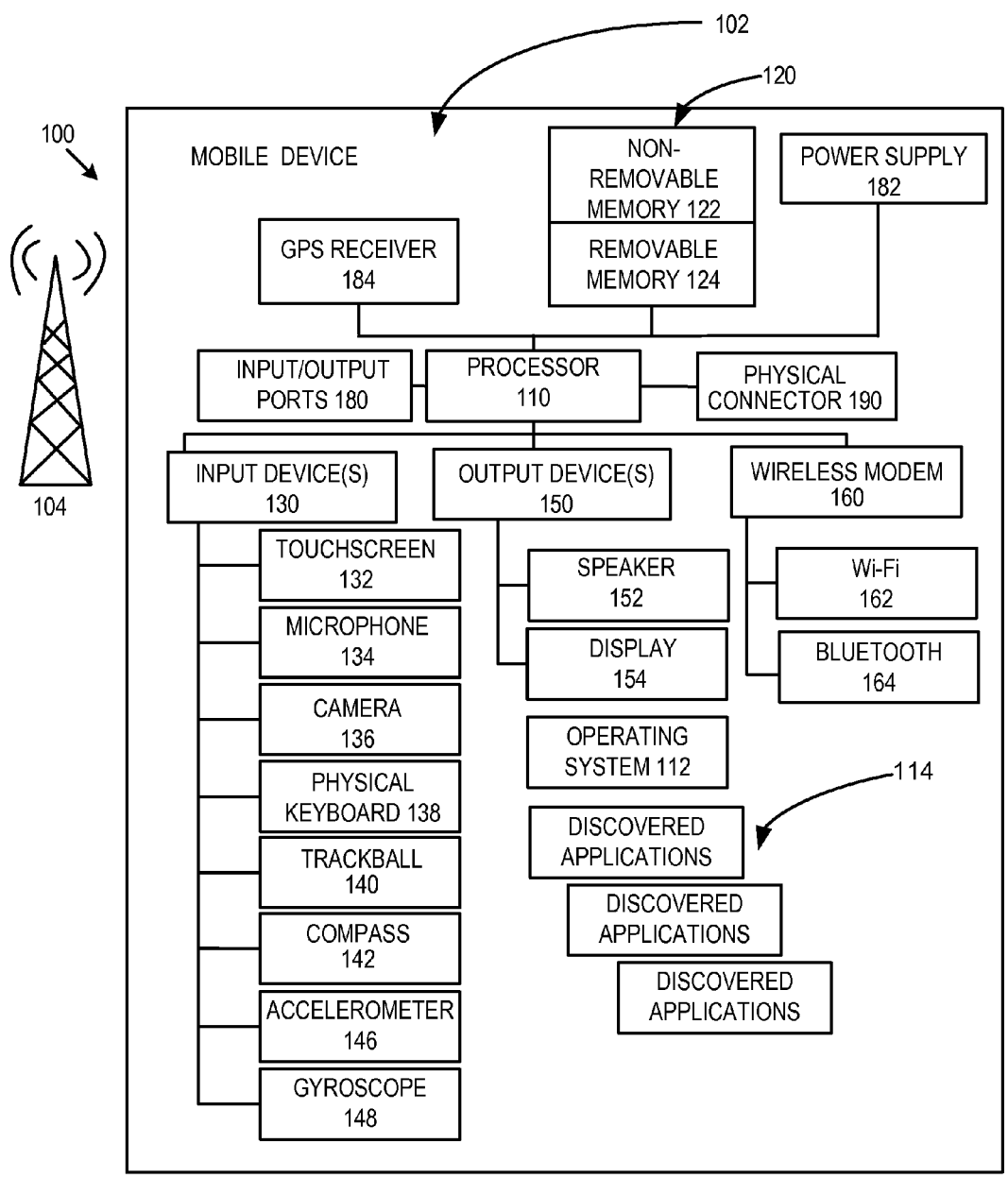
FIG. 1 is a system diagram depicting an exemplary mobile device, including a variety of optional hardware and software components.

This disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

The described things and methods described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged, omitted, or performed concurrently. Moreover, for the sake of simplicity, the attached figures may not show the various ways in which the disclosed things and methods can be used in conjunction with other things and methods. Additionally, the description sometimes uses terms like "produce," "generate," "select," "capture," and "provide" to describe the disclosed methods. These terms are high-level abstractions of the actual operations that are performed. The actual operations that correspond to these terms can vary depending on the particular implementation and are readily discernible by one of ordinary skill in the art.

Any of the disclosed methods can be implemented as computer-executable instructions stored on one or more computer-readable storage media (e.g., non-transitory computer-readable media, such as one or more volatile memory components (such as DRAM or SRAM), or nonvolatile memory components (such as hard drives)) and executed on a computer (e.g., any commercially available computer, including smartphones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, HTML5, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Theories of operation, scientific principles or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

In the following description, certain terms may be used such as "up," "down," "upper," "lower," "horizontal," "vertical," "left," "right," "over," "on," "near," and the like. These terms are used, where applicable, to provide some clarity of description when dealing with relative relationships. But, these terms are not intended to imply absolute relationships, positions, and/or orientations.

As used in this disclosure, "automatically" means that an act can occur after a previous act without the need to receive additional user input before initiating performance of the act.

As used in the disclosure, "application" includes programs implemented with computer-executable instructions executable by a mobile device, as well as programs where some or all of the application functionality is accessed over a network, for example, network applications or web applications.

I. Example Mobile Device

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., a cell phone, smartphone, handheld computer, or Personal Digital Assistant (PDA)) and can allow wireless two-way communications with one or more mobile communications networks 104, such as a cellular or satellite network.

The illustrated mobile device 100 can include a controller or processor 110 (e.g., a signal processor, microprocessor, ASIC, or other control and processing logic circuitry) for performing such tasks as signal coding, data processing, input/output processing, power control, and/or other functions. An operating system 112 can control the allocation and usage of the components 102, and provide support for one or more discovered application programs 114. The discovered application programs 114 can be discovered using techniques and apparatus described herein, and automatically downloaded and installed on the mobile device 100, or accessed using a computer network. The discovered application programs 114 can include common mobile computing applications (e.g., image-capture applications, email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the discovered applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touch screen 132, microphone 134, camera 136, physical keyboard 138, trackball 140, compass 142, accelerometer 146, and/or gyroscope 148, and one or more output devices 150, such as a speaker 152 and one or more displays 154. Other possible output devices (not shown) can include piezoelectric or haptic output devices. Some devices can serve more than one input/output function. For example, touchscreen 132 and display 154 can be combined in a single input/output device.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth 164 or Wi-Fi 162). The wireless modem 160 is typically configured for communication with one or more cellular networks, such as a GSM network for data and voice communications within a single cellular network, between cellular networks, or between the mobile device and a public switched telephone network (PSTN).

The mobile device 100 can further include at least one input/output port 180, a power supply 182, a satellite navigation system receiver 184, such as a Global Positioning System (GPS) receiver, and/or a physical connector 190, which can be a USB port, IEEE 1394 (FireWire) port, and/or RS-232 port. The illustrated components 102 are not required or all-inclusive, as any components can be deleted and other components can be added.

The mobile device 100 can use multiple input sources for determining geospatial position, velocity, or orientation of the mobile device. For example, GPS receiver 184 can be used to determine geospatial coordinates by receiving signals transmitted from global positioning satellites. Alternatively, signals received from one or more mobile communications networks 104 (e.g., terrestrial communication networks) can be used to determine geospatial coordinates. In some examples, data received using GPS receiver 184 and one or more mobile communications networks 104 can be combined to provide more accurate geospatial position or orientation, and in a faster manner. In addition, the mobile device 100 can use data from one or more compasses 142, accelerometers 146 and/or gyroscopes 148 to calculate the orientation, velocity, and/or heading of the mobile device. In some examples, an image capture device, such as a camera 136, can be used with image recognition software to determine current context data for the mobile device 100. For example, images of famous landmarks (e.g., the Eiffel Tower, the Space Needle, or the Taj Mahal), billboards, or merchant logos (e.g., logos displayed outside a Starbucks store or McDonald's restaurant) can be used to determine the location or context of the mobile device.

II. Example Implementation Environment

Figure 2:
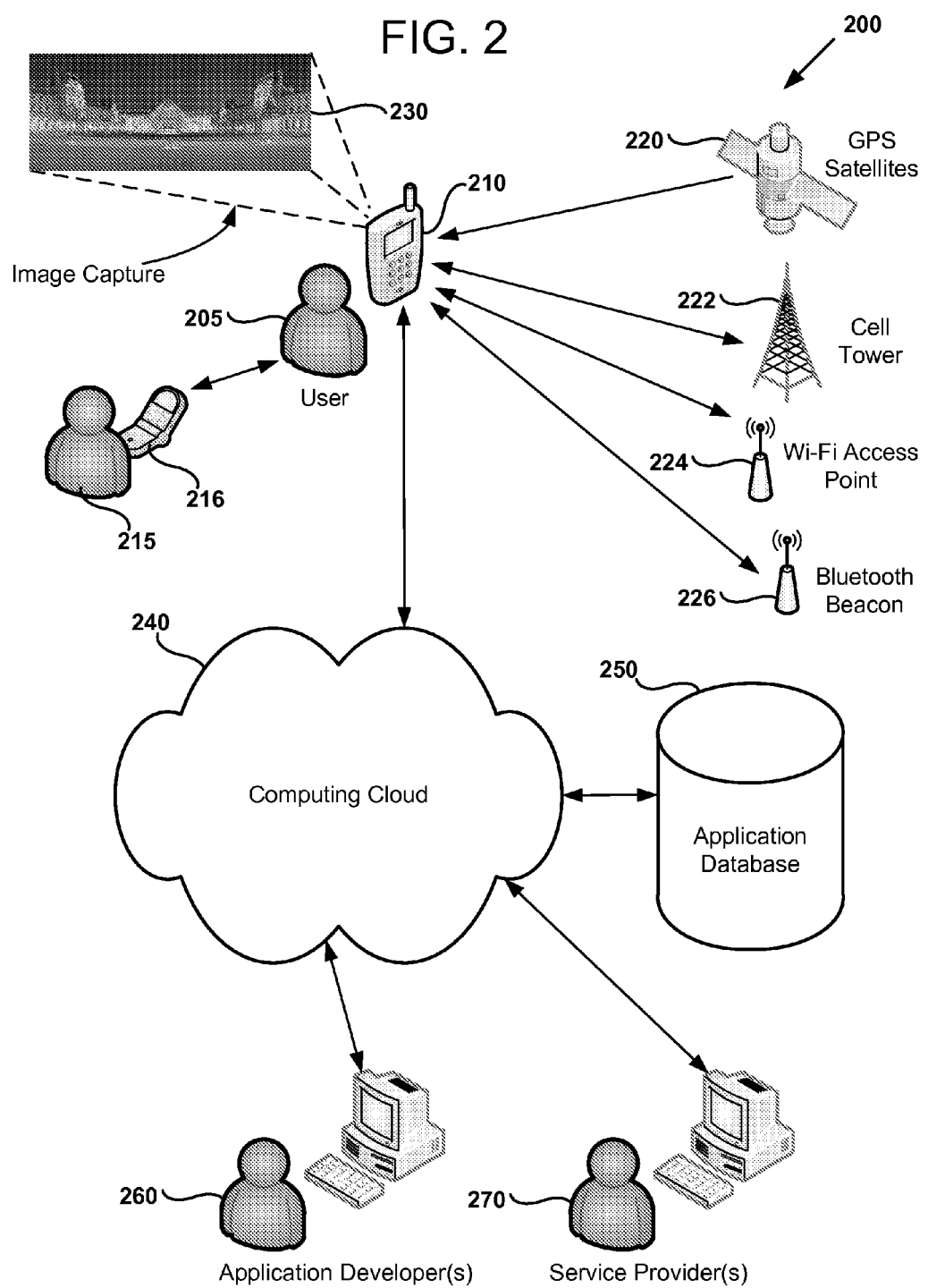
FIG. 2 is a generalized example of a suitable environment in which described embodiments, techniques, and technologies can be implemented.

FIG. 2 depicts an example computing environment 200 suitable for implementing described embodiments, techniques, and technologies disclosed herein. As shown, a user 205 is carrying a smartphone 210. In some examples, other platforms can be used, including but not limited to, cellphones, smartphones, PDAs, handheld devices, handheld computers, PDAs, touch screen tablet devices, tablet computers, and laptop computers.

As shown, the smartphone 210 can receive global positioning data signals from one or more satellites 220. Other location data can also be received or determined from one or more cell phone towers 222, a Wi-Fi access point 224 (e.g., an 802.11b or 802.11n access point), or a Bluetooth beacon 226. This location data can include, for example, a Service Set Identifier (SSID), Media Access Control (MAC) address, Bluetooth Device Address, or other data that can be used to determine location data for a Wi-Fi or Bluetooth access point. Cell phone technologies than can be used to determine location data include Cell Identification, Enhanced Cell Identification, U-TDOA, TOA, AOA, E-OTD, or Assisted-GPS, and in some examples the smartphone 210 can use two or more of the location-determining technologies in combination with each other to determine or enhance location data. Location data can also be received or determined from other mobile device users, for example, a user 215 with a Bluetooth-enabled cellphone 216.

The smartphone 210 can also acquire an image 230, using, e.g., a camera, and submit the captured image to an image-recognition service. The image-recognition service can use the image 220 to determine the location of the smartphone 210. For example, the smartphone 210 can capture an image of a landmark, billboard, logo, or bar code in proximity with the mobile device, and submit the image to a service provider 270 (described below), which can then estimate the user's current location. The smartphone 210 in FIG. 2 is depicted capturing an image of the Louvre museum. Based on determining that the captured image is relevant to the Louvre museum, applications associated with the Louvre (providing images, background information, and locations on a map for exhibits) can be automatically downloaded and executed using the smartphone 210.

The smartphone 210 can also communicate with one or more servers located in a computing cloud 240. The computing cloud 240 can store and read data by accessing an application database 250, which stores application metadata, including computer-readable instructions and/or addresses for application programs, audio data, and video data that can be executed or played back by the smartphone 210, as well as context data for determining the relevance of the application metadata given a current context of the mobile device. Location data can be also be stored in the application database 250. The mobile device environment and context are "current" in that they include dynamically-updated data reflecting the state of the object and nearby surrounds. For example, an application for providing information about animals can be associated with application metadata describing locations within the boundaries of a zoo. The computing cloud 240 can communicate with the mobile device 210, application developers 260, and/or service providers 270 using the Internet, cellular networks, or other suitable communication networks.

The computing cloud 240 can receive application metadata from one or more application developers 260 for describing the relevancy of mobile device applications in a given mobile device environment. For examples, developers of specific applications, such as a museum guide for the Louvre museum or a zoo guide for the Woodland Park Zoo can generate application metadata describing geographical locations where a specific application is more relevant, and then upload the application metadata, along with the application itself, to an application store or other application discovery service. The application metadata can also describe other relevant data for a current mobile device environment. For example, application metadata for a mountain resort location can describe skiing-related applications as more relevant during winter months and mountain biking-related applications as more relevant during summer months.

As shown, the computing environment 200 can include one or more service providers 270 that provide service components for generating application metadata. For example, a first service component gathers data based on location-based information and associates the location data with applications or other content. A second service component operates with a mobile device to provide content to a mobile device user based upon their current geographical location as well as other context data describing their current environment, including traffic conditions, weather, season, time, or events (e.g., promotions, concerts, or festivals). A third service component can be used to aggregate geographical data based on known points of interest (e.g., retailer locations such as Starbucks stores or McDonald's restaurants) to provide more colloquial forms of location information.

III. Example of Providing Application to Mobile Device

Figure 3:
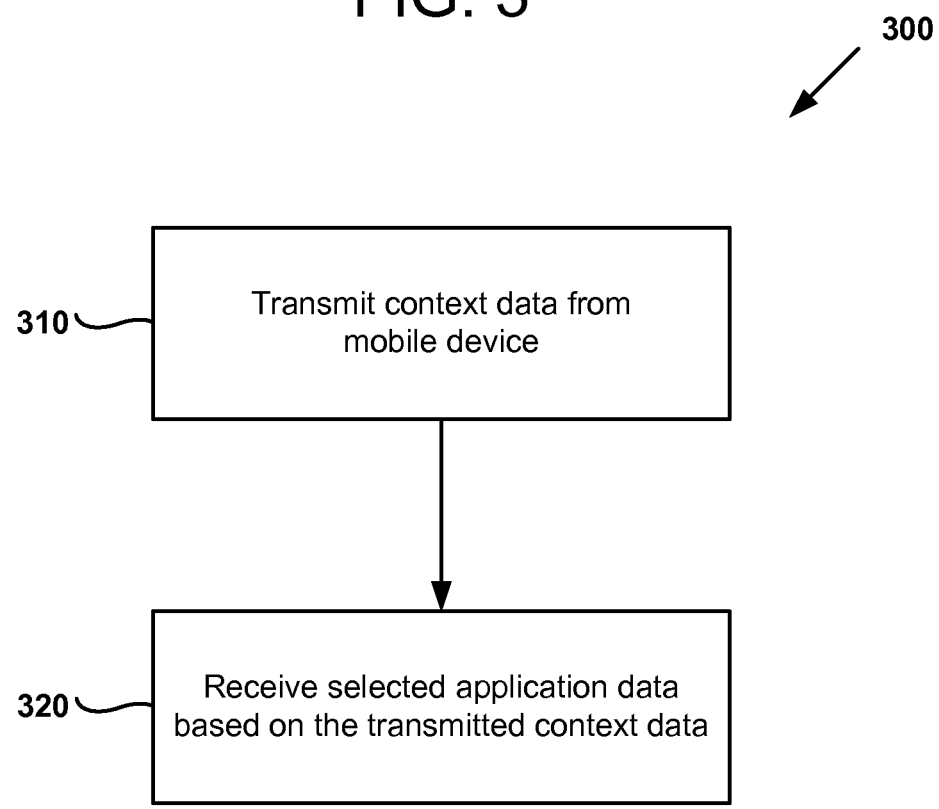
FIG. 3 is a flow chart that outlines an exemplary implementation of the disclosed technology, including transmitting context data.

FIG. 3 is a flow chart 300 that outlines an exemplary method of transmitting context data and receiving applications based on a relevancy determined using context data and application metadata for the applications as can be used in certain embodiments of the disclosed technology.

At process block 310, context data describing the current environment of a mobile device is transmitted (e.g., to a remote server or computing cloud). The context data can include data describing the geospatial location of a user or mobile device; data describing identifying information for an access point, such as a data from a cell phone transmitter; Bluetooth device address; WiFi information such as node name, network address, MAC address, and/or SSID; sensor data from a compass, accelerometer, and/or gyroscope; other identifying information; or data for a particular user, such as calendar data describing events or locations.

At process block 320, application data describing the one or more applications selected based on the transmitted context data is received using, for example, a computer network. In some examples, the application data includes computer-readable instructions executable by a mobile device for executing one or more of the selected applications. In some examples, the application metadata includes references (e.g., a network address or web address associated with an application) that describe network locations for accessing an application from a remote location. In some examples, the application metadata includes data such as audio, video, or image data that is determined to be relevant for the given context data. In some examples, the application data can refer to applications that have already been installed on a mobile device. In some examples, the application data is deleted from the device if the application is not used or selected by the user based on certain criteria, such as a period of time, while in other examples the application data for an unused application remains on the device for an indeterminate period of time.

IV. Example of Providing Context Data

Figure 4:
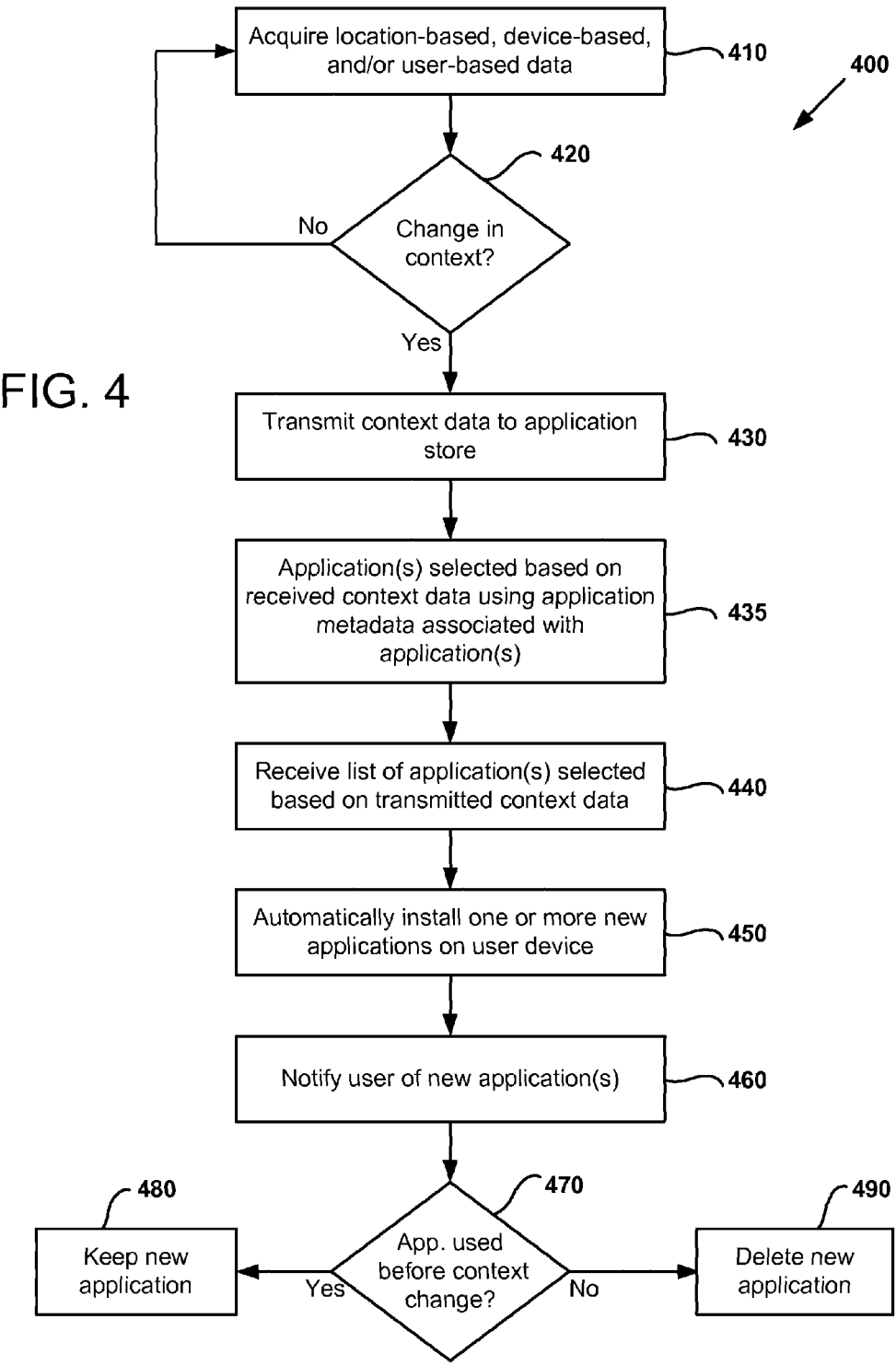
FIG. 4 is a flow chart that further details the exemplary implementation illustrated in FIG. 3.

FIG. 4 is a flow chart 400 that further details the method shown in FIG. 3. At process block 410, context data such as location data, device functionality data, or user data (e.g., calendar data) is acquired.

At process block 420, the context data is analyzed to determine if a change in context has occurred. For example, the location data can be analyzed to determine whether the location has changed sufficiently to effect a change in context. If a context change is detected, the method proceeds to process block 430. Otherwise, the method proceeds back to process block 410.

At process block 430, some or all of the context data is transmitted to a server at a remote location (e.g., a server hosting an application store) or to a server in a computing cloud. The server or computing cloud analyzes the context data along with application metadata associated with mobile device applications to determine one or more applications that are most relevant for a particular context. This analysis is described further below in FIGS. 5 and 6 and related text. In some examples, the determination of a change in context data is performed by a server or computing cloud, instead of relying on the mobile device to determine a change in the context data at process block 420.

At process block 435, the transmitted context data is evaluated and one or more applications are identified as being more relevant for the current device environment based on the transmitted context data and application metadata associated with an application for the mobile device. For example, based on context data describing the current location of a mobile device within a pre-defined physical location, one or more applications associated with the location are identified as relevant. Additional examples of generating application metadata are described below at, for example, FIGS. 5-6 and accompanying text.

At process block 440, a list of one or more identified applications determined to be more relevant at process block 430 is received. In some examples, a mobile device user is also notified of the availability of new applications with sound playback, vibration, or other feedback. In some examples, the mobile device waits for user input before launching the application, while in other examples, the application can be automatically launched.

At process block 450, one or more of the applications from the list are automatically installed on the mobile device. Because the applications are automatically installed, the user does not need to provide input in order to discover or install the application. However, in some examples, the user is queried before installing or activating discovered applications. For example, the mobile device can query the user before activating applications that require payment to use. In some examples, a limited-functionality demo version of the application is installed and automatically available, and a full-featured version can be installed after payment is received.

At process block 460, the user is notified of the availability of one or more newly-available applications on the mobile device. In some examples, notification includes an audible tone or haptic feedback. In other examples, a portion of a touch screen display indicates the presence of new applications. For example, FIGS. 10A and 10B and associated text, below, illustrate examples of user notification using a touch screen display.

At process block 470, a check is made to determine whether the downloaded applications should be retained. For example, if a mobile device is determined to have left the designated context area without using the downloaded application, then the application is not retained. In other examples, instead of monitoring the designated context area, a timer is used to determine when to remove applications (for example, a one hour, twenty-four hour, or other time period). In some examples, the user can "pin" the application, indicating a desire to keep the downloaded application, using a user interface, instead of being required to invoke the application in order to retain it. If it is determined that the application should be retained, the method proceeds to process block 480, but if it is determined that the application should not be retained, the method proceeds to process block 490.

At process block 480, the application is kept on the mobile device by, e.g., designating the application as a permanently-installed user application. In some examples, the application is not downloaded to the mobile device until the user attempts to invoke the application, and the downloading is combined with process block 480 to keep the application. In some examples, saving the application creates additional context data indicating that the downloaded application is more relevant to the user or context area. In some examples, saving the application creates additional application metadata, indicating the popularity of the application, or relevance of the application to the context in which the application was downloaded.

At process block 490, the application is deleted from the mobile device. In some examples, the application has not yet been downloaded, but other entries of application metadata, such as a URL, are removed from a list of currently installed applications. In some examples, a record is made of the application deletion, for use in processing context data in the future, or for providing additional application metadata. For example, a user that deletes an application, and then re-enters a context area, will not be re-presented with the deleted application. In other examples, the record of application deletion can be used to adjust relevancy determinations for the application, or for related applications.

In some examples, certain process blocks are omitted or performed in a different order. For example, after receiving a list of applications at process block 440, an alternative method checks to determine whether one or more of the listed applications are already available on the mobile device (e.g., whether computer-executable instructions or network addresses associated with an application are available on the device prior to process blocks 435 or 440), and, if so, is omitted at process block 450 for one or more of the applications that are already available.

V. Example of Processing Context Data

Figure 5:
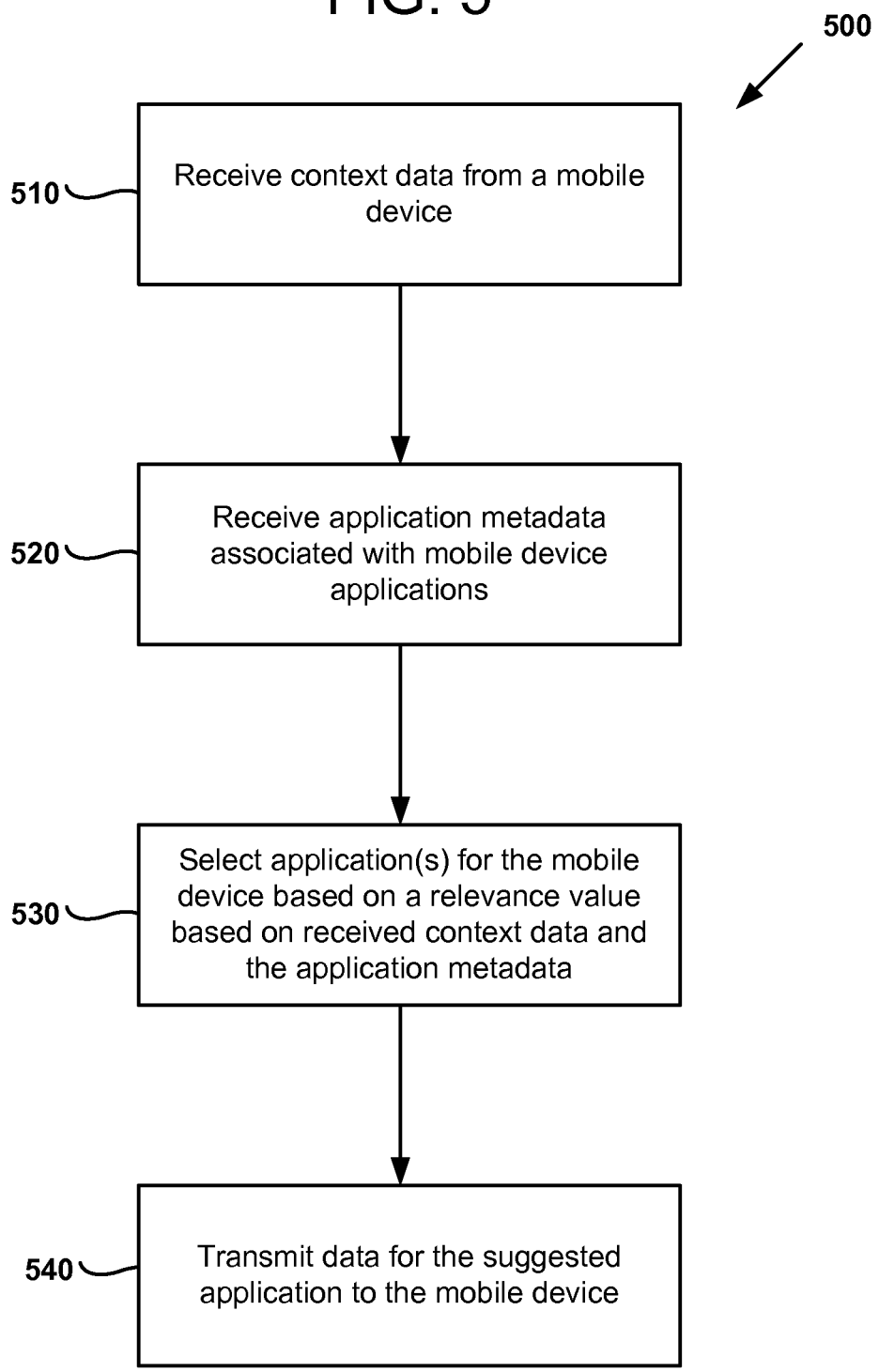
FIG. 5 is a flow chart that outlines another exemplary implementation of the disclosed technology, including using application metadata to generate a list of relevant applications based on context data received from a mobile device.

FIG. 5 is a flow chart 500 that outlines an exemplary method of receiving context data from a mobile device, receiving application metadata associated with mobile device applications, and selecting applications based on a determined relevance between the context data and the application metadata, as can be used in certain embodiments of the disclosed technology.

At process block 510, context data is received from a mobile device, such as a smartphone or PDA. As described above, the context data need not be limited to location data, but can include data describing user-specific information, such as information from a calendar application (including vacation or meeting data) or information describing devices in proximity with the mobile device (e.g., a television or home entertainment system). In some examples, the mobile device detects changes in its current context, and based on the determination, transmits context data. In other examples, the mobile device sends data representing its current context, which is received and used to determine whether a change in context has occurred.

At process block 520, application metadata is received for applications executable using the mobile device. For example, the application metadata can include geographical information describing a point using longitude, latitude, and altitude, or describe a polygon comprising several points. For example, metadata for an application associated with the Louvre museum could include a definition of a polygon surrounding the physical location of the museum. In some examples, multiple locations can be used. For example, Starbucks Coffee can define an individual geographical point for each of several thousand stores, the metadata associating each of those points with an identical application. In some examples, the metadata includes data that describes criteria describing environment-based conditions under which applications should be promoted to a mobile device (e.g., based on payments made by an application publisher) and can include ranges of values and logic functions.

At process block 530, application suggestions are generated for the mobile device using the context data received from the mobile device and application metadata associated with one or more applications. For example, if the context data indicates that the current location of the mobile device is within a predetermined distance of a geographical point associated with a Starbucks store, a Starbucks Application can be one of the suggested applications. Thus, an application store, implemented using a server or computing cloud, can return a list of applications that match the conditions described in application data, based on the context data received at process block 510.

A cloud-based service can be leveraged to associate rich geographical or environment-based metadata with mobile applications such that they can be promoted and delivered in the context of a user context. In some examples, the user context includes location data regarding physical location relative to geographical region, a defined area, nearby objects, or a specific physical location. The location data includes a location identifier, but can also include information associated with a user's environment, including traffic conditions, weather, season, nearby features, and nearby events. This allows automatic notification not only of applications that have been associated with the current location, but also notification based on being in proximity with a particular device (e.g. a television, car, projector, or personal computer). For example, if a mobile device is determined to be in proximity with a particular television, and a remote control application is available for the mobile device that can be used to control the television, then the remote control application can be automatically downloaded, and the user notified of the recently-downloaded application.

At process block 540, data for the one or more applications is transmitted to the mobile device. In some examples, this includes computer-readable instructions executable by the mobile device. In other examples, a URL or a network address is transmitted to indicate where the application code is located and can be retrieved by the mobile device.

VI. Example Use of Application Metadata and Context Data

Figure 6:
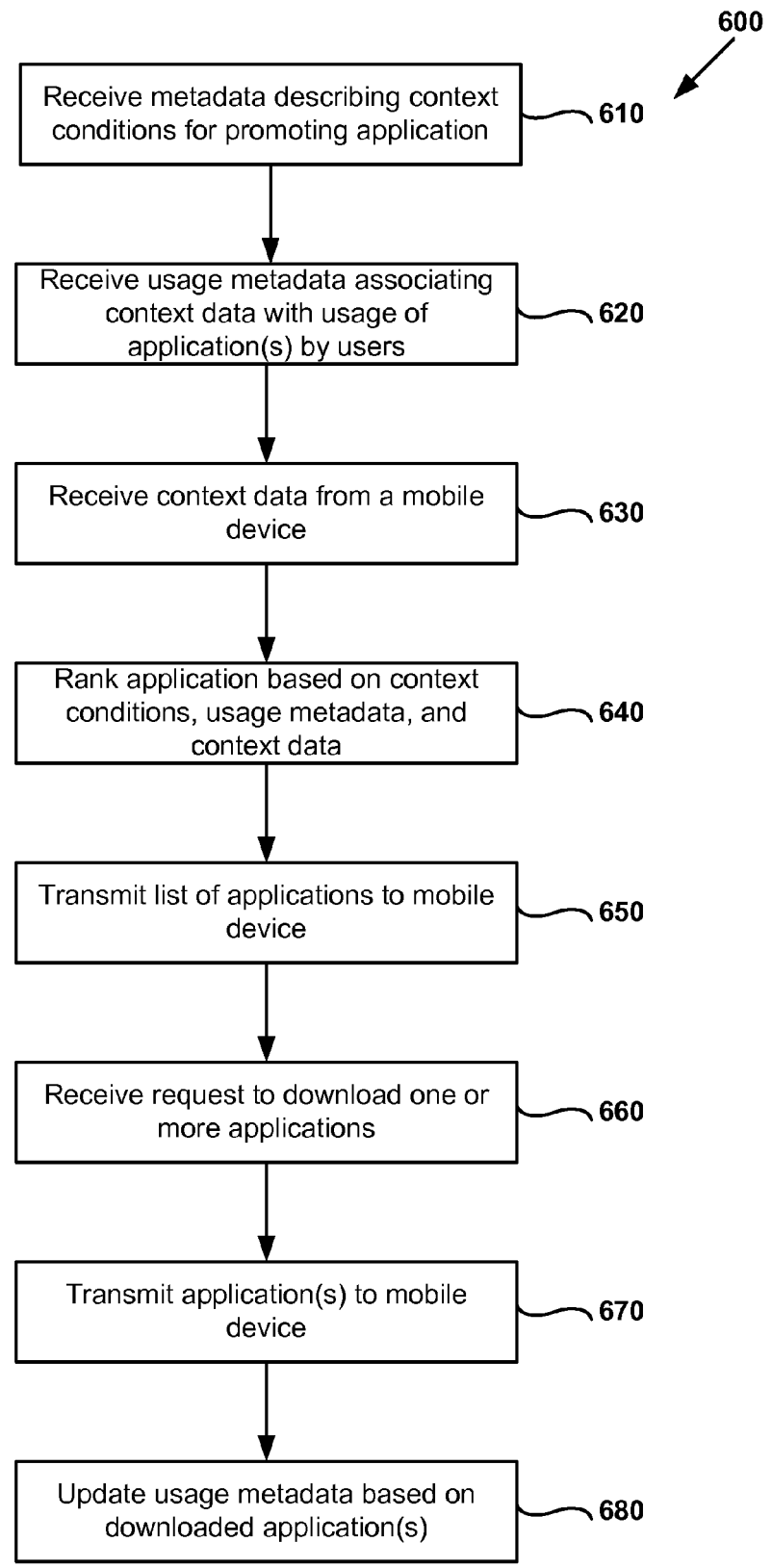
FIG. 6 is a flow chart that further details the exemplary implementation illustrated in FIG. 5.

FIG. 6 is a flow chart 600 that further details the method shown in FIG. 5.

At process block 610, application metadata is received that describes context conditions for promoting an application. This metadata can include location data, such as polygons or points as described above in FIG. 5 and related text. The metadata also can include additional data, such as payments made to promote a particular application. The application metadata can also include non-geographical conditions, such as the time of day, dates, or seasons.

At process block 620, usage data is received associating the usage data for an application with usage of the application by other users. This usage data can be used to generate additional application metadata describing contexts that are more likely to be relevant, and allow discovery of applications that have not had application metadata explicitly generated by an application provider. For example, usage data showing that an application for a zoo is frequently used within a certain geographical location can be used to generate application metadata that increases the relevancy of the application to the geographical location.

At process block 630, context data comprising information such as location data, device functionality, or user data (e.g., calendar data) is acquired.

At process block 640, the context data and application metadata are analyzed, and a list of applications, and relevancy scores for those applications, are generated using the application metadata, usage data, and context data received at process blocks 610, 620, and 630. The list of applications can be ranked using the generated relevancy scores.

At process block 650, the list of applications generated at process block 640 is transmitted to a mobile device. The relevancy scores can also be transmitted to enable a mobile device user to ignore applications with less relevant scores, or enable sorting, displaying, or other operations on the list of applications at the mobile device.

At process block 660, a request is received to download one or more of the applications from the list. The requested application(s) can vary from the list of applications that was originally transmitted to the mobile device in several ways. For example, the mobile device can check to see if any of the listed applications are already installed on the mobile device, and not request download of these applications. In other examples, applications are not requested because of parental controls on the mobile device, or because a user of the device has previously indicated that the particular application should not be downloaded. In some examples, the request to download is also accompanied by account information or payment information.

At process block 670, one or more applications that were requested at process block 660 are transmitted to the mobile device. As discussed above, in some examples instructions executable by the mobile device are transmitted, while in other examples a URL or network address used to access an application are transmitted.

At process block 680, application metadata comprising application usage data can be updated to reflect the download or subsequent invocations of the application on the mobile device.

VII. Example of Providing Application Metadata

Figure 7:
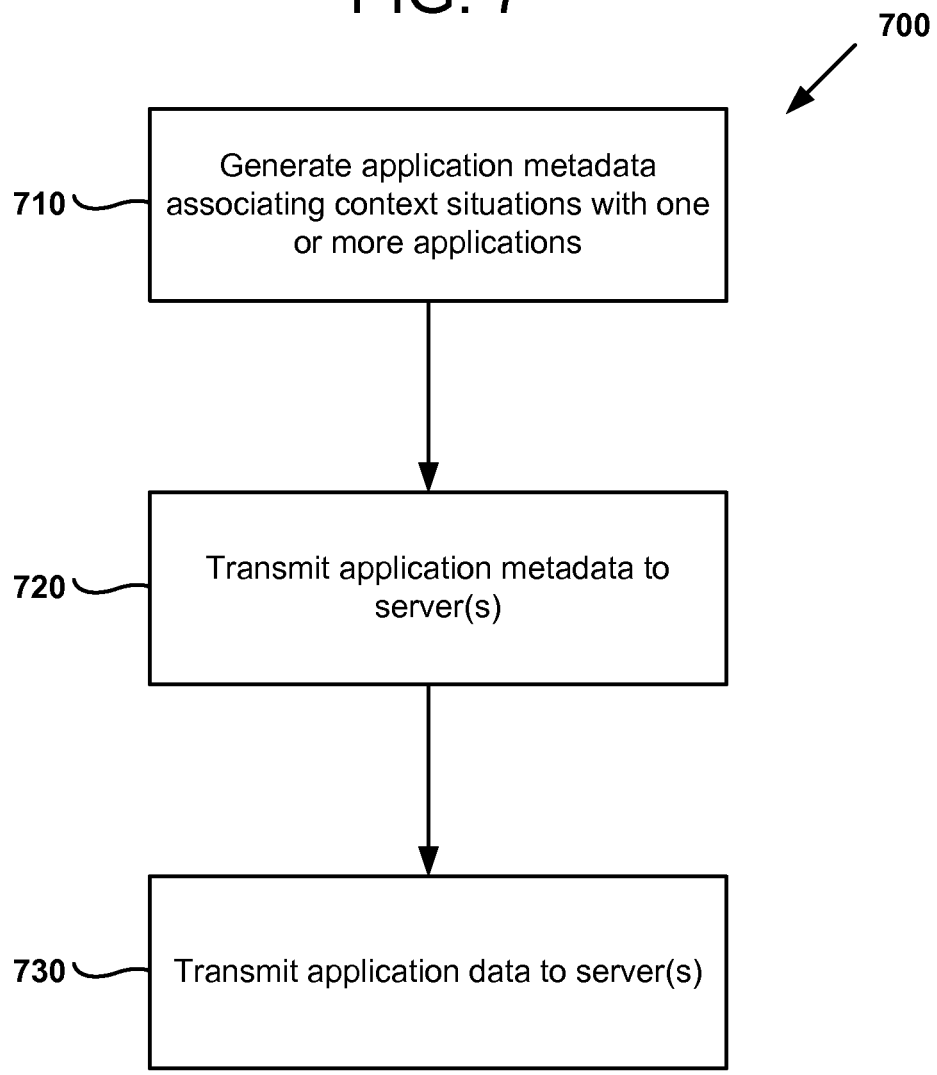
FIG. 7 is a flow chart that outlines another exemplary implementation of the disclosed technology, including generating application metadata for an application.

FIG. 7 is a flow chart 700 that outlines an exemplary method of generating application metadata for an application and transmitting the metadata and the application to a server or computing cloud as can be used in certain embodiments of the disclosed technology.

At process block 710, application metadata is generated for determining relevance of an application given context data describing a mobile device environment. In some examples, the metadata includes location data describing physical locations. In some examples, non-location data describing the environment can be included with the metadata, including traffic conditions, weather, season, nearby features, and nearby events. The application metadata can describe the environment as a simple binary relevant/not relevant condition, or describe more complex conditions, for example, by including more discrete levels of relevance (e.g., based on distance from a point) or include logic functions based on one or more context data parameters.

At process block 720, the application metadata generated at process block 710 is transmitted to one or more servers, where it is stored for later comparisons to current mobile device context data. In some examples, the servers are components of an application store or "marketplace" that can also distribute applications to mobile device using user-initiated download techniques (e.g., the same application store can provide applications to a mobile device as a user browses and downloads applications manually, as well as providing automatic downloads based on a mobile device context environment). The applications store can also handle other details associated with distributing mobile device applications, such as handling payment systems or providing software updates.

At process block 730, application data associated with the application metadata is transmitted to the servers. In some examples, the application data describes the location of, for example, a web application, using a URL. In some examples, the application data includes data for processing by another application, for example, audio or video data. In some examples, the application data includes computer-readable instructions that when executed by a mobile device or computer, implement all or a portion of an application's functionality.

VIII. Example Technologies for Application Metadata

Figure 8:
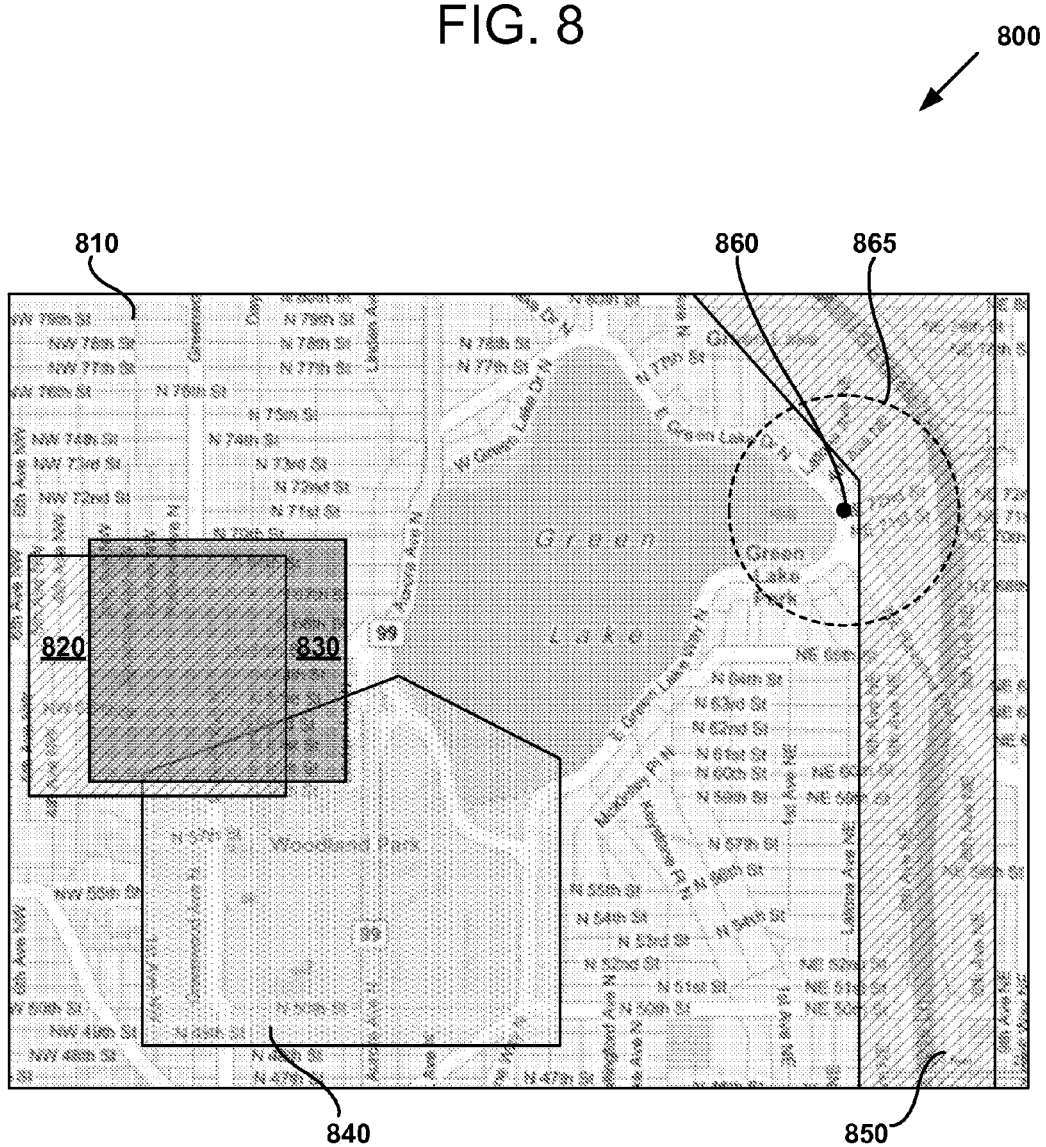
FIG. 8 is a drawing of a map showing locations associated with several mobile device applications.

FIG. 8 is a drawing 800 of a street map 810 that is overlaid with representations of map regions that are described by application metadata for an application. For example, two rectangle regions 820 and 830 are associated with a fast-food restaurant and a coffee shop, respectively, and applications associated with those stores can be automatically discovered when a mobile device is determined to be located within the regions. A region associated with the Woodland Park Zoo is associated with a polygon 840, and can be associated with applications related specifically to the Woodland Park Zoo. The region can also be associated with other applications frequently used at the zoo based on the popularity of applications (e.g., determined by frequency of downloading or invoking a given application) within the polygon 840. Another polygon 850 is associated with a limited access highway, as shown on the map 810, and applications for providing maps or traffic reports are described in application metadata as being highly relevant for mobile device contexts within the polygon 850. Similar to the zoo applications, applications can be explicitly associated with the polygon 850 by an application publisher, or the application can be automatically associated with the polygon based on previous usage or popularity by users while their location is within or near the polygon.

Finally, it is not required that regions be described by polygons or rectangles, but regions can also be described using points. For example point 860 indicates the location of a coffee shop. The dashed circle 865 indicates those portions of the maps that are currently designated within the region for an application associated with the coffee shop. The radius of the circle can be varied by, for example, the server providing the application metadata, or by a user preference set using the mobile device to expand or contract the radius of the dashed circle 865 enclosing the region.

Figure 9:
FIG. 9 is a listing of XML code suitable for describing geographical regions associated with mobile device applications.

FIG. 9 is exemplary XML code 900 for describing regions in an example of the disclosed technology writing in GeoRSS. GeoRSS is an example format for exchanging geographical data, but other suitable formats for describing geographical data can also be used. The XML code 900 includes an entry for a Woodland Park Zoo application, including a polygon description ("<georss:polygon>47.663696 . . . ") of the associated region 840 (as shown in FIG. 8) and a URL for downloading a zoo application ("http://example.org/2010/woodlandparkzooguide/"). Also shown is an entry for a coffee shop, which is described using a point ("<georss:point>47.679863-122.325608</georss:point>") instead of a polygon or rectangle, and the entry also includes a URL ("http://example.org/2010/starbuckscoffeeguide") for downloading an application associated with the point.

IX. Example User Interface for Application Discovery

Figure 10A:
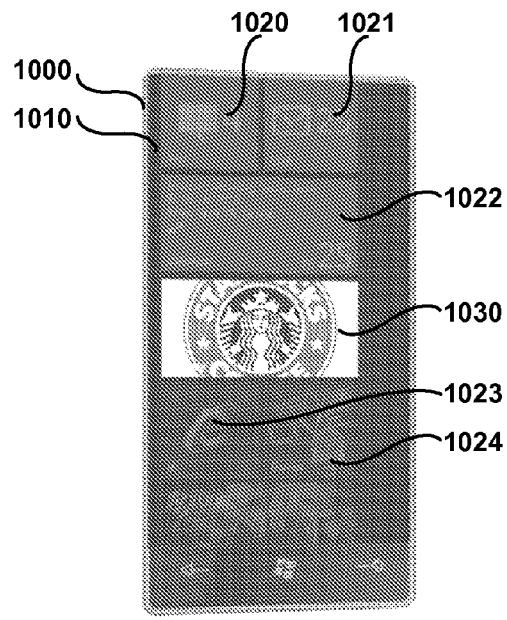
FIGS. 10A and 10B illustrate a mobile device user interface for automatically discovering applications using context data.

FIG. 10A depicts a mobile device 1000 with a touch screen display 1010. The touch screen display 1010 is shown displaying several buttons 1020-1024, which are designated areas of the touch screen display that receive touch input selected an associated function. As shown, buttons 1020-1024 include buttons for selecting Instant Messaging, e-mail, calendar, Web browser, and game functionality, respectively. In addition, an additional application discovery button 1030 is shown. The application discovery button 1030 is highlighted by the device in order to notify the user that a new application (represented by the icon displayed on the button) is installed on the mobile device and available for immediate use. Thus, the user can press the button 1030 to invoke an application that is new to the mobile device, without manually performing the acts of discovering, downloading, and installing the application.

Figure 10B:
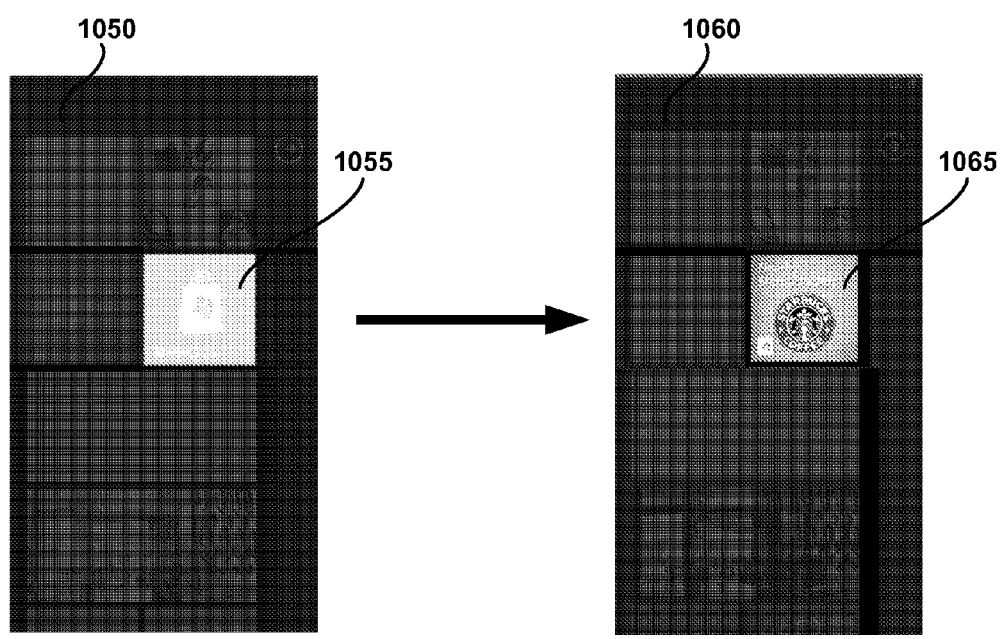

FIG. 10B depicts a mobile device 1050 while in a first context state 1050 of having no discoverable applications available, as well as the same mobile device 1060 while in a second context state where discoverable applications are available. As shown, while in the first context state at 1050, an area of the screen is reserved for displaying a button 1055. When there are no discoverable applications available, the user can press the button 1055 in order to manually be directed towards an application store to find and download applications for the mobile device manually. After changing to the second context state (at 1060) (e.g., by moving the device to a new location, or another change in context such as a different time of day or a calendar event), the button 1065 is changed to display the most relevant application for the current context state.

Figure 11:
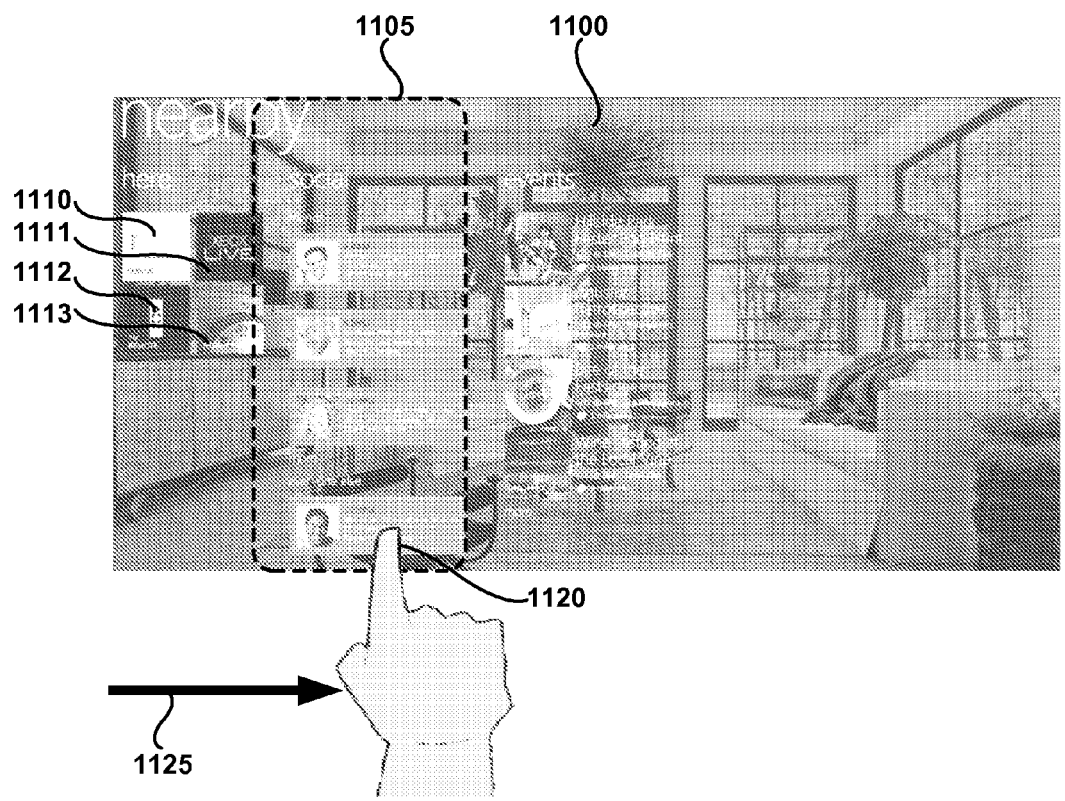
FIG. 11 illustrates a mobile device screen display, including a display of multiple applications that have been discovered using context data.

FIG. 11 depicts a mobile device screen 1100 displaying multiple automatically discoverable applications, associated friends, and events. As shown, the screen 1100 does not fit within a mobile device touch screen display at once, but instead, only the portion of the screen within the dashed lines 1105 is displayed to a user. The user can scroll the screen to the right, revealing discoverable applications, by drawing a finger 1120 across the surface of a touch screen display in the direction indicated by the arrow 1125. The applications 1110-1113 available include a music streaming application 1110, a gaming application 1111, a television remote application 1112, and a thermostat application 1113. Each of these applications is automatically downloaded and discoverable by the user based not on the current geographic location (e.g., the determined longitude and latitude of the mobile device), but based on discovering devices in the vicinity, using, for example, a Bluetooth transmitter or WiFi connection coupled with the devices. For example, after detecting the presence music streaming hardware associated with a music streaming application 1110, an application associated with the music streaming hardware (e.g., an application for controlling playback using the music streaming hardware) is automatically downloaded to the mobile device.

X. Example Computing Environment

Figure 12:
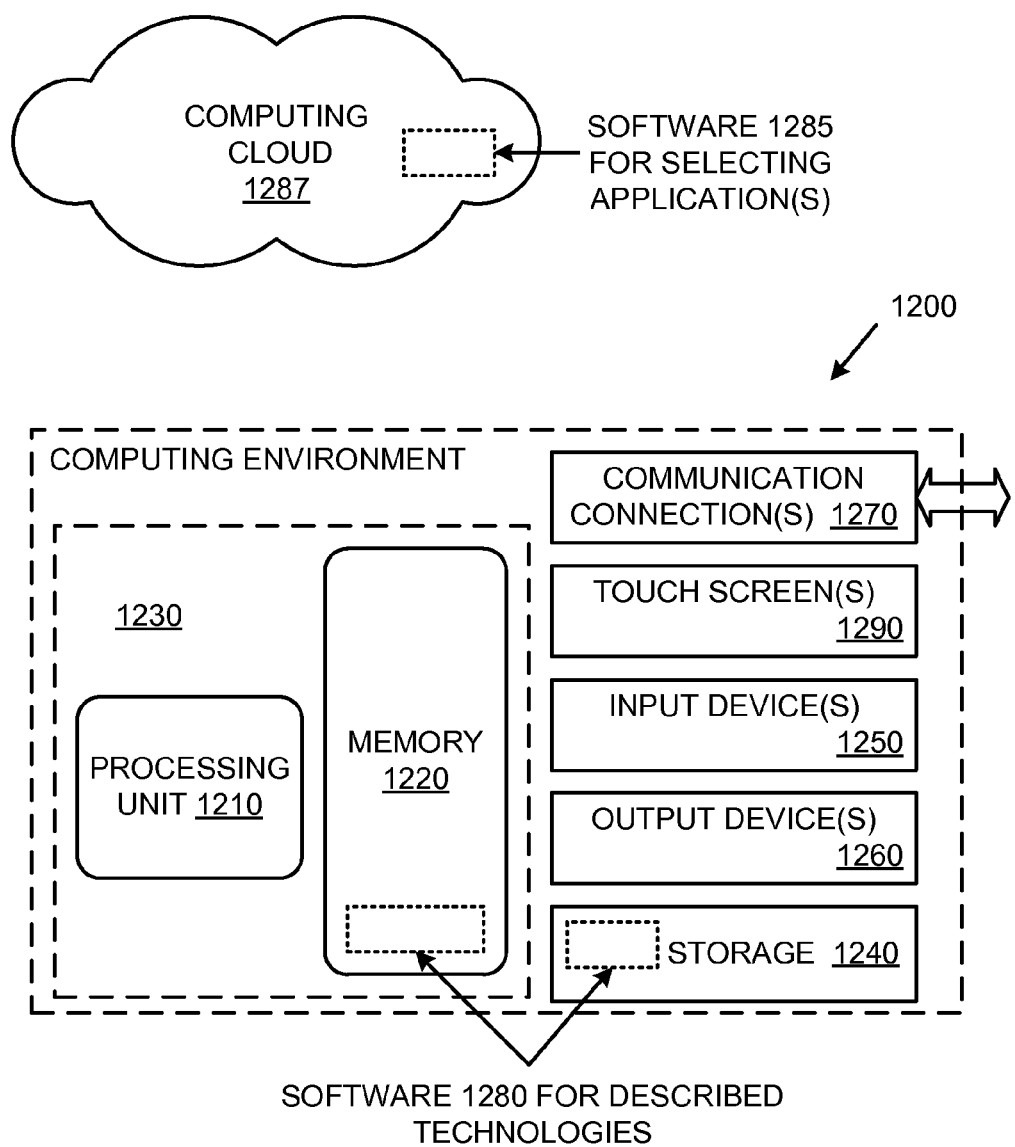
FIG. 12 illustrates a generalized example of a suitable computing environment in which described embodiments, techniques, and technologies can be implemented.

FIG. 12 illustrates a generalized example of a suitable computing environment 1200 in which described embodiments, techniques, and technologies may be implemented. For example, the computing environment 1200 can implement functionality for generating and transmitting context data, application metadata, and network addresses and computer-executable instructions for applications, as described herein.

The computing environment 1200 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules or instructions may be located in both local and remote memory storage devices.

With reference to FIG. 12, the computing environment 1200 includes at least one central processing unit 1210 and memory 1220. In FIG. 12, this most basic configuration 1230 is included within a dashed line. The central processing unit 1210 executes computer-executable instructions and may be a real or a virtual processor. In a multi-processing system, multiple processing units execute computer-executable instructions to increase processing power and as such, multiple processors can be running simultaneously. The memory 1220 may be volatile memory (e.g., registers, cache, RAM), non-volatile memory (e.g., ROM, EEPROM, flash memory, etc.), or some combination of the two. The memory 1220 stores software 1280 that can, for example, implement the technologies described herein. A computing environment may have additional features. For example, the computing environment 1200 includes storage 1240, one or more input devices 1250, one or more output devices 1260, one or more communication connections 1270, and one or more touch screens 1290. An interconnection mechanism (not shown) such as a bus, a controller, or a network, interconnects the components of the computing environment 1200. Typically, operating system software (not shown) provides an operating environment for other software executing in the computing environment 1200, and coordinates activities of the components of the computing environment 1200.

The storage 1240 may be removable or non-removable, and includes magnetic disks, magnetic tapes or cassettes, flash memory, CD-ROMs, CD-RWs, DVDs, or any other non-transitory storage medium which can be used to store information and that can be accessed within the computing environment 1200. The storage 1240 stores instructions for the software 1280, which can implement technologies described herein. Additional software 1285 for selecting applications using data, including context data, application data, and application metadata, can be located in a computing cloud 1287.

The input device(s) 1250 may be a touch input device, such as a keyboard, keypad, mouse, pen, or trackball, a voice input device, a scanning device, proximity sensor, image-capture device, or another device, that provides input to the computing environment 1200. For audio, the input device(s) 1250 may be a sound card or similar device that accepts audio input in analog or digital form, or a CD-ROM reader that provides audio samples to the computing environment 1200. The output device(s) 1260 may be a display, printer, speaker, CD-writer, or another device that provides output from the computing environment 1200. The touch screen 1290 can act as an input device (e.g., by receiving touch screen input) and as an output device (e.g., by displaying a list of downloaded applications to notify a user).

The communication connection(s) 1270 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 1200. By way of example, and not limitation, with the computing environment 1200, computer-readable media include memory 1220 and/or storage 1240. As should be readily understood, the term computer-readable storage media includes non-transitory storage media for data storage such as memory 1220 and storage 1240, and not transmission media such as modulated data signals.

XI. Example Implementation Environment

Figure 13:
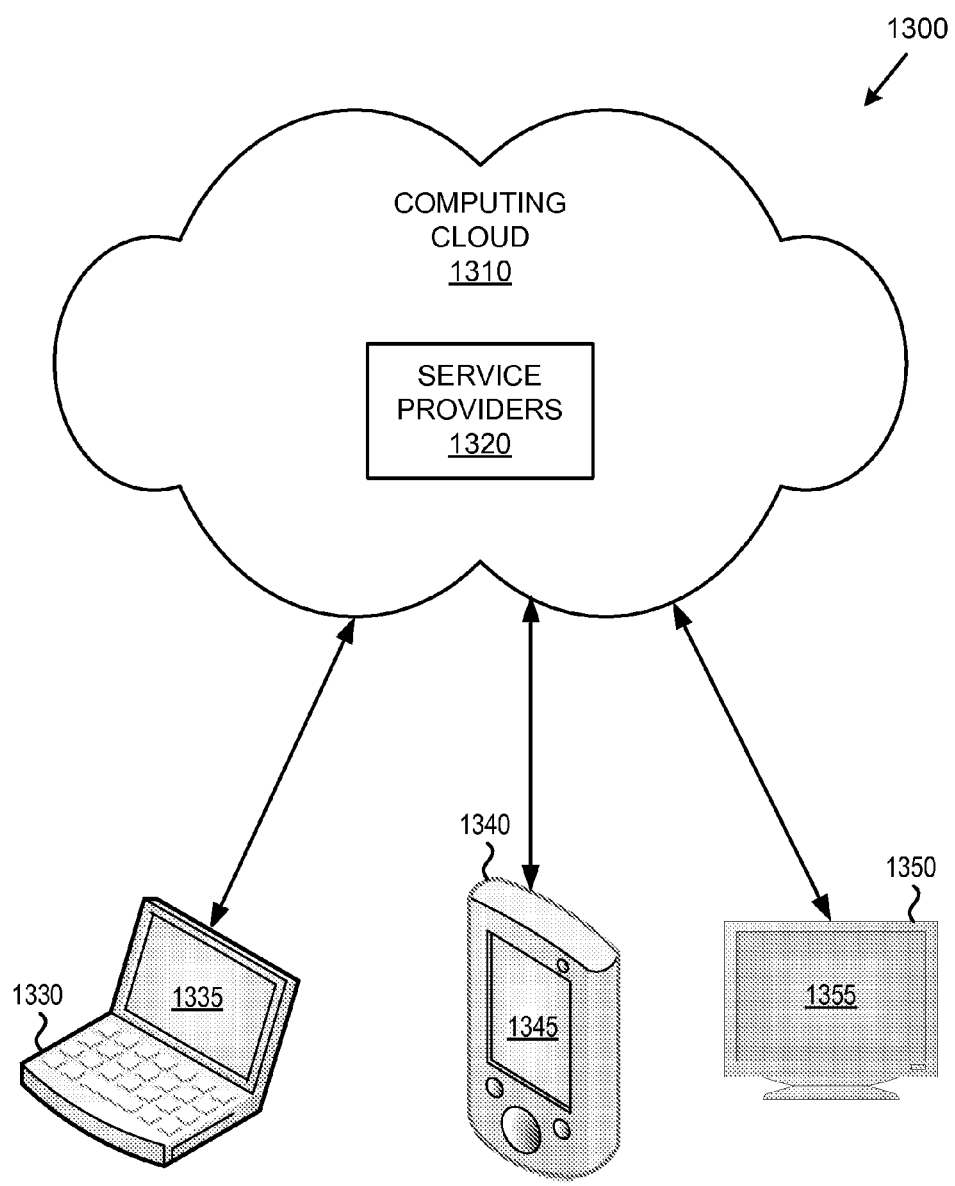
FIG. 13 illustrates a generalized example of a suitable implementation environment for a mobile device connected to a computing cloud.

FIG. 13 illustrates a generalized example of a suitable implementation environment 1300 in which described embodiments, techniques, and technologies can be implemented.

In example environment 1300, various types of services (e.g., computing services) are provided by a computing cloud 1310. For example, the computing cloud 1310 can comprise a collection of computing devices, which can be located centrally or distributed, that provide cloud-based services to various types of users and devices connected via a network such as the Internet. The implementation environment 1300 can be used in different ways to accomplish computing tasks. For example, some tasks (e.g., processing user input and presenting a user interface) can be performed on local computing devices (e.g., connected devices 1330, 1340, 1350) while other tasks (e.g., storage of data to be used in subsequent processing) can be performed in the cloud 1310.

In example environment 1300, the cloud 1310 provides services for connected devices 1330, 1340, and 1350 with a variety of screen capabilities. Connected device 1330 represents a device with a computer screen 1335 (e.g., a mid-size screen). For example, connected device 1330 could be a personal computer such as desktop computer, laptop, notebook, netbook, or the like. Connected device 1340 represents a device with a mobile device screen 1345 (e.g., a small size screen). For example, connected device 1340 could be a mobile phone, smartphone, personal digital assistant, tablet computer, and the like. Connected device 1350 represents a device with a large screen 1355. For example, connected device 1350 could be a television screen (e.g., a smart television) or another device connected to a television (e.g., a set-top box or gaming console) or the like. One or more of the connected devices 1330, 1340, 1350 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1300. For example, the cloud 1310 can provide services for one or more computers (e.g., server computers) without displays.

Services can be provided by the cloud 1310 through service providers 1320, or through other providers of online services (not depicted). For example, cloud services can be customized to the screen size, display capability, and/or touch screen capability of a particular connected device (e.g., connected devices 1330, 1340, 1350).

In example environment 1300, the cloud 1310 provides the technologies and solutions described herein to the various connected devices 1330, 1340, 1350 using, at least in part, the service providers 1320. For example, the service providers 1320 can provide a centralized solution for various cloud-based services. The service providers 1320 can manage service subscriptions for users and/or devices (e.g., for the connected devices 1330, 1340, 1350 and/or their respective users). In addition, data identifying one or more of the connected devices 1330, 1340, and 1350 can be used as context data in order to select applications relevant for the respective connected devices.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The techniques and solutions described in this application can be used in various combinations to provide a better user experience with mobile devices, including mobile devices such as smartphones.

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of the disclosed invention may be applied, it should be recognized that the illustrated embodiments are only preferred examples of the invention and should not be taken as limiting the scope of the invention.

We claim:

1. A method of discovering a first installed application for a device having a controller or processor, memory, an input source configured to determine one or more of geospatial position, velocity, or orientation of the device, and a configurable button implemented with a touch screen display, the method comprising:

by the device, configuring the button to launch an application store when the button is pressed;

by the device, selecting the first installed application based on context data and on application metadata representing relevance of the first application to the current environment of the device, wherein the context data is derived from detecting, with the input source coupled to the device, movement of the device to a current environment of the device, and the context data is based at least in part on the current geographical location of the device;

by the device, reconfiguring the button to invoke the first installed application when the button is pressed;

by the device, displaying the reconfigured button on the touch screen display of the device;

by the device, upon receiving a signal representing the reconfigured button being pressed, invoking the first installed application;
after moving the device to a second current device environment, transmitting second context data representing the second current device environment; and
automatically receiving computer-readable instructions for a second application, wherein:
the computer-readable instructions are executable on the device,
the second application is selected based on the transmitted second context data, and
the second application is a different application than the first application.

2. The method of claim 1, wherein:
the first installed application comprises computer-readable instructions for the first application; and
the instructions are executable on the device.

3. The method of claim 1, wherein:
the first installed application is a network application.

4. The method of claim 1, wherein:
the first installed application comprises an address for remotely retrieving computer-readable instructions.

5. The method of claim 1, wherein the application metadata is selected based at least in part on user ratings for the first installed application.

6. The method of claim 1, wherein the application metadata is selected based at least in part on a number of users of the first application.

7. The method of claim 1, wherein the application metadata is selected based at least in part on features of a nearby device in the current environment.

8. The method of claim 1, wherein the application metadata is selected based at least in part on marketing payments for the first application.

9. The method of claim 1, wherein the application metadata is selected based at least in part on popularity of the first application.

10. The method of claim 1, wherein the context data is determined based on discovering wireless devices in the vicinity of the device.

11. The method of claim 1, wherein:
the device is coupled to a touch screen display; and
the touch screen display is configured to display and receive input for the button.

12. A method, comprising:
receiving context data from a remote device, the context data being generated with one or more input sources coupled to the remote device based at least in part on a current location of the remote device;
receiving application metadata associated with one or more applications executable by the remote device, the application metadata comprising location data representing relevance of the one or more applications to at least the current location based on previous usage of at least one of the one or more applications by other users while the remote device was in or near the current location;
selecting one of the one or more applications based at least in part on the context data and the location data;
transmitting data for the selected application to the remote device;
when the device is in a different location than the first location, transmitting second context data representing the second current device environment; and
automatically receiving computer-readable instructions for a second, different application selected based on the transmitted second context data.

13. The method of claim 12, further comprising transmitting computer-readable instructions for the selected application to the remote device, wherein the computer-readable instructions, when executed by the remote device, cause the remote device to perform a method associated with the selected application.

14. The method of claim 12, wherein the data for the selected application includes one or more network addresses associated with the selected application.

15. The method of claim 12, wherein the data for the selected application includes audio data, video data, or audio data and video data.

16. The method of claim 12, wherein the context data is first context data, the method further comprising:
receiving second context data from the remote device, the second context data being based at least in part on a different current location of the remote device;
determining that there are no discoverable applications available relevant to the second context data; and
based on the determining, transmitting data to the remote device to allow a remote device user to be manually directed towards an application store to find and download applications for the remote device manually.

17. A device comprising:
a controller or processor;
one or more input sources coupled to the controller or processor for determining geospatial position, velocity, or orientation of the device;
a touch screen interface;
memory or data storage coupled to the controller or processor storing computer-readable instructions that when executed by the controller or processor, cause the device to perform:
with the touch screen interface, displaying an application discovery button, the device being operable to launch an application store responsive to the application discovery button being selected;
sending context data describing a device environment to a server or computing cloud, the device environment being based on data received from the input sources;
automatically installing an application on the device, the installed application being designated likely to be of interest based on the sent context data; and
after the installing the application, changing the application discovery button to display an icon for the installed application with the touch screen interface, thereby notifying a user of the device that the installed application can be immediately invoked by pressing the application discovery button.

18. The device of claim 17, further comprising:
after the installing the application, receiving input selecting the application discovery button; and
responsive to the receiving input, executing the installed application on the device.

19. The device of claim 17, wherein the application is an executable program.

20. The device of claim 17, wherein the context data describes devices in proximity with the device.

21. The device of claim 17, wherein the context data does not include location data describing physical location of the device.

22. The device of claim 17, wherein the application is designated based on usage data for the application in relation to the sent context data.

23. A device comprising:
a controller or processor;
one or more input sources coupled to the controller or processor;
a touch screen interface;
memory or data storage coupled to the controller or processor storing computer-readable instructions that when executed by the controller or processor, cause the device to perform:
configuring a configurable button implemented using the touch screen interface to launch an application store when the button is pressed;
selecting a first installed application based on context data and on application metadata describing environment-based conditions under which applications should be promoted to a mobile device first installed application to the current location of the device, wherein the context data is derived from detecting, with the inputs sources, movement of the device to a current location of the device, and is based at least in part on the current location of the device;
reconfiguring the button to invoke the first installed application when the button is pressed;
displaying the reconfigured button on a display of the device;
upon receiving a signal representing the button being pressed, invoking the first installed application; and
after moving the device to a second current device environment, transmitting second context data representing the second current device environment; and
automatically receiving computer-readable instructions for a second application executable on the device, the second application being selected based on the transmitted second context data and on application metadata provided by a developer of the second application.

24. The device of claim 23, wherein:
the first installed application comprises computer-readable instructions for the first application; and
the instructions are executable on the device.

25. The device of claim 23, wherein:
the first installed application comprises an address for remotely retrieving computer-readable instructions.

26. The device of claim 23, wherein the application metadata is selected based at least in part on user ratings for the first installed application.

27. The device of claim 23, wherein the application metadata is selected based at least in part on a number of users of the first application.

28. The device of claim 23, wherein the application metadata is selected based at least in part on features of a nearby device in the current location.

29. The device of claim 23, wherein the application metadata is selected based at least in part on marketing payments for the first application corresponding to the current location of the device.

30. The device of claim 23, wherein the application metadata is selected based at least in part on popularity of the first application.

31. The device of claim 23, wherein the context data is determined based on discovering wireless devices in the vicinity of the device.

32. The device of claim 23, wherein:
the touch screen interface is configured to display and receive input for the button.

33. The device of claim 23, wherein the inputs sources include an image capture device.

* * * * *